United States Patent [19]
Rietsch

[11] Patent Number: 4,951,340
[45] Date of Patent: Aug. 28, 1990

[54] CAR WASH WASHER INSTALLATION

[75] Inventor: Gilbert J. Rietsch, Rochester, Mich.

[73] Assignee: Gilbert J. Rietsch, Jr., Troy, Mich.

[21] Appl. No.: 300,777

[22] Filed: Jan. 23, 1989

[51] Int. Cl.⁵ .................................................. B60S 3/06
[52] U.S. Cl. ................................ 15/97.3; 15/DIG. 2; 15/53.3
[58] Field of Search ................ 15/53 A, 53 AB, 53 B, 15/97 B, DIG. 2

[56] References Cited

U.S. PATENT DOCUMENTS

| | | | |
|---|---|---|---|
| 3,969,782 | 7/1976 | Williams | 15/53 AB |
| 4,290,161 | 9/1981 | Fishering et al. | 15/53 AB |
| 4,756,041 | 7/1988 | Hanna | 15/53 AB |

FOREIGN PATENT DOCUMENTS 0674946  7/1979  U.S.S.R. .......................... 15/DIG. 2

*Primary Examiner*—Edward L. Roberts
*Attorney, Agent, or Firm*—John R. Benefiel

[57] ABSTRACT

A side washer installation for an automatic car wash line in which each side washer is bottom mounted on a mounting arrangement comprised of a swing arm having upwardly extending drive shaft over which the washer is mounted. An internal web plate is secured within each washer cylinder which rests atop a flange attached to the drive shaft, the flange bolted to the web plate at assembly. The drive motor and associated hardware are located beneath each side washer to remove this componentry from the field of view of the occupants of vehicles passing down the wash line. A subgrade plumbing system for the hydraulic motors and also spray materials is routed through a network of subgrade plumbing chases extending beneath the concrete surfaces and having stubs adjacent each washer for enabling installation of the plumbing system.

4 Claims, 3 Drawing Sheets

CAR WASH WASHER INSTALLATION

FIELD OF THE INVENTION

This invention concerns equipment for automated car wash lines and more particularly the installation of the side washers used to wash the various surfaces of vehicles.

BACKGROUND OF THE INVENTION

Automated car washes typically have generally vertically disposed sets of rotating washers of various sizes positioned to scrub the vertical surfaces of vehicles as the vehicles are conveyed down a car wash line. Such washers comprise cylinders having strips of wiper material attached to extend radially outwardly. The conventional approach is to mount such washers on overhead swing arms which are urged towards the line and which swing away as the vehicle proceeds past the washer to exert a scrubbing pressure on the vehicle exterior surfaces. The washer cylinder is typically mounted at the top extending down from the swing arm and a hydraulic motor is mounted to rotate the washer and produce the scrubbing action. An extensive overhead plumbing system is installed to supply hydraulic fluid to the motors and also to supply spray liquids used in the washing operation.

This arrangement has several disadvantages. Firstly, the elevated location of the motor exposes the motors, hydraulic lines and associated hardware components to the view of occupants within the vehicle, adversely affecting the aesthetics of the installation.

This exposed position also directly subjects the motors and other components to the sprayed liquids. Also, if a leak occurs in the plumbing or the motor, hydraulic fluid is apt to spill onto the washer cloth strips, either necessitating a tedious and difficult cleaning task or the outright scrapping of the relatively costly washer.

If the vehicle bumper impacts the lower end of the washer mounting cylinder, the force of the impact exerts with great leverage, since acting over nearly the distance of the full length of the cylinder. The great leverage of such impacts increases the incidence of breakage and other damage to the motor, motor shaft, brackets, etc.

Another marked disadvantage is the difficulty of installing the washer cylinder to the overhead motor since the relatively heavy cylinder must be held while a mechanical connection is made to hold the cylinder on the drive shaft.

The overhead location of the motors and the need for an extensive overhead plumbing network contributes substantially to the cost of constructing the wash line. Costly rigid piping such as stainless steel, copper, or galvanized steel must be employed with numerous points of clamping and bracing, and considerable labor is thus entailed. The exposed plumbing also degrades the aesthetics of the equipment and makes it vulnerable to damage.

It has heretofor been known to mount individual washer cylinders to a bottom located swing arm, but these have been for individual, special purpose washers such as rocker panel washers, rather than to an entire car wash. A wrap around bottom mounted washer is described in U.S. Pat. No. 4,290,161.

It is the object of the present invention to provide a side washer for automated car wash lines which avoids the above disadvantages.

SUMMARY OF THE INVENTION

This and other objects of the invention as will become apparent upon a reading of the following specification and claims are achieved by an installation in which all of the washers are mounted to swing arms which are located at floor level beneath the bottom of the washers, with each hydraulic motor mounted to the swing arm beneath its associated washer and covered by the washer cylinder.

Each of the washer cylinders are connected to a motor drive shaft by being lowered onto a drive flange, an interior web plate fixed at predetermined axial location within the cylinder to allow the weight of the cylinder to rest on the web plate while a connection therebetween are made.

A subgrade plumbing system is employed by installing plumbing chases in and beneath the concrete work, located to enable the installation of plumbing lines for the hydraulic motors therein, leading to the hydraulic power equipment.

This installation has a number of important advantages. Firstly, the aesthetics are improved substantially by removing from the field of view of the vehicle occupants, the hydraulic motors, hardware components and associated plumbing along the entire length of the car wash line. This protected location also reduces the incidence of damage to these components.

The subgrade plumbing network for the hydraulic lines enabled by the floor level motor location allows the use of inexpensive flexible and unbraced plumbing lines which are much more easily installed to greatly reduce the cost of construction.

The floor level location of the drive motor reduces the leverage of impacts in acting to damage the motor shaft since such impacts, usually with the vehicle bumper, are relatively low to the ground close to the height of the drive shaft bearing support.

Soiling of the washer wiper strips is also avoided, since leaks cannot spill down onto the washer.

Finally, this installation has the advantage of greatly enhancing the ease with which a washer may be installed by allowing the weight of the washer web plate to rest on the motor drive flange as the connecting bolts are installed.

DESCRIPTION OF THE DRAWING VIEWS

DETAILED DESCRIPTION

In the following detailed description, certain specific terminology will be employed for the sake of clarity and a particular embodiment described in accordance witht he requirements of 35 USC 112, but it is to be understood that the same is not intended to be limiting and should not be so construed inasmuch as the invention is capable of taking may forms and variations within the scope of the appended claims.

According to the concept of the present invention, all of the side washers in an automated car wash line are bottom mounted, to locate the hydraulic drive motor and associated hardware and fittings and plumbing system beneath the side washer. This removes this equipment from the field of view of the occupants of vehicles being washed and thus presents a much more trim and clean visual impression of the equipment to persons within the vehicle washed as it passes down the wash line.

Figure 1:
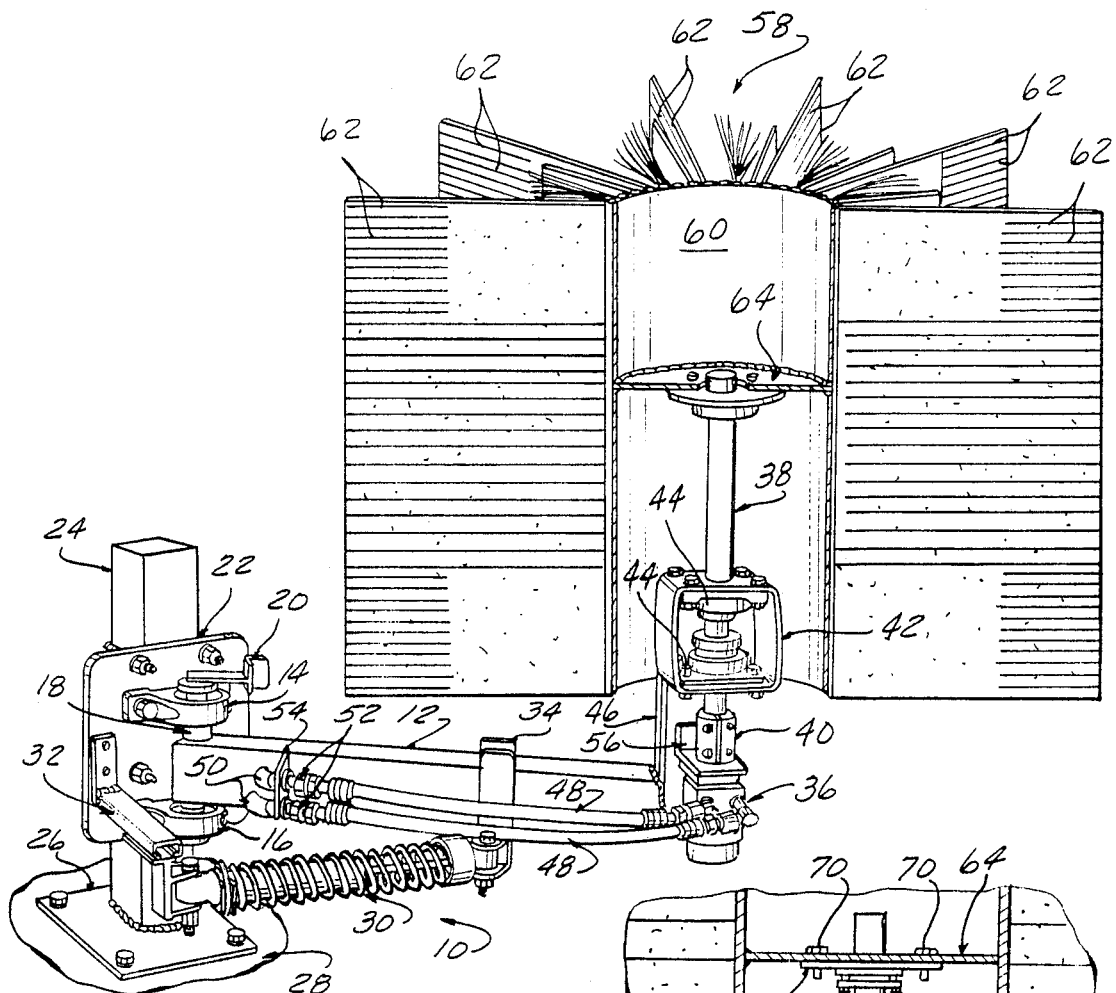
FIG. 1 is a perspective fragmentary view of an individual washer support assembly according to the present invention.

FIG. 1 illustrates a bottom mounting installation 10 contemplated as being used on each side washer along the line. The mounting installation 10 includes a swing arm 12 mounted for rotation about a vertical axis on spaced bearings 14, 16 receiving a pivot axle 18, a stop arm 20 limiting the extent of rotation. The bearings 14, 16 are secured to a mounting plate 22 fixed to a stanchion member 24 welded to a base plate 26 bolted to anchors in the concrete pad 28.

A spring - shock absorber assembly 30 urging the swing arm 12 outwardly is supported at one end on a first bracket 32 bolted to the plate 22 and at the other end to any intermediate point along the length of the swing arm 12 on a second bracket 34.

A hydraulic drive motor 36 is suspended from a washer drive shaft 38 by having its output shaft connect thereto with a split sleeve coupling 40. The drive shaft 38 is itself carried in a bearing housing 42 having spaced bearings axially fixing and rotationally supporting the drive shaft 38.

The bearing housing 42 is attached to an upright end piece 46 forming the free end of the swing arm 12. The hydraulic motor 36 is supplied via short coupling hydraulic lines 48 connected to a hydraulic power package (not shown) via hoses 50 connected thereto via fittings 52 held on a support bracket 54. The hydraulic motor 36 is free to rotate slightly, with a torque plate 56 limiting the rotation by turning into the end piece 46. This limited free rotation prevents too great a torque from being applied at startup of the hydraulic motor 36, eliminating the tendency for shearing of the drive components at start up with the washers stalled by engagement with a vehicle.

A side washer 58 is shown installed in FIG. 1, and is comprised of an inner cylinder 60, in turn composed of arcuate segments of aluminum extrusions each having a series of lengthwise ribs forming channels into which are fit strips of wiping material 62, extending radially outward from the cylinder 60. This washer construction is well known to those knowledgable in this field.

An intermediate web plate 64 is welded to the interior of each extrusion segment to form the cylinder 60 to be affixed thereto. The drive shaft 38 has a tapered sleeve clamp 64 attached to a section of the shaft 38 extending above the bearing housing 42. This attaches a flange 68 welded to the clamp 64 to the drive shaft 38 to be rotated therewith.

Figure 2:
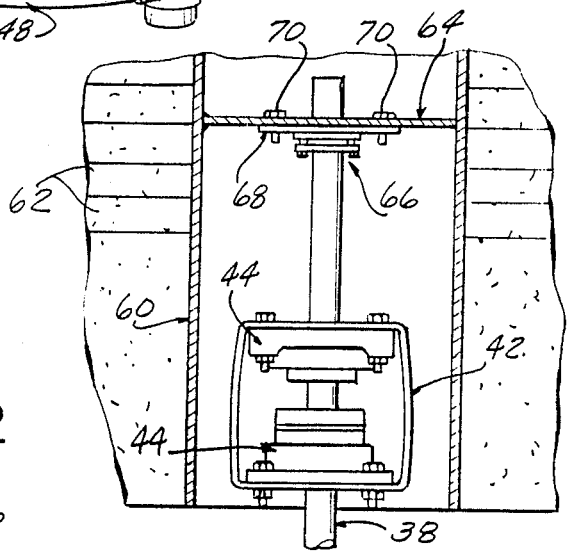
FIG. 2 is a fragmentary sectional view of the connection between the drive shaft and washer cylinder.

The cylinder 60 may thus be supported during installation by resting the web plate 64 on the flange 68, and allowed bolts 70 to be installed in threaded holes in the flange 68 as shown in FIG. 2.

According to the concept of the present invention, all of the washers in a given wash line are floor level mounted by the arrangement described above.

Figure 3:
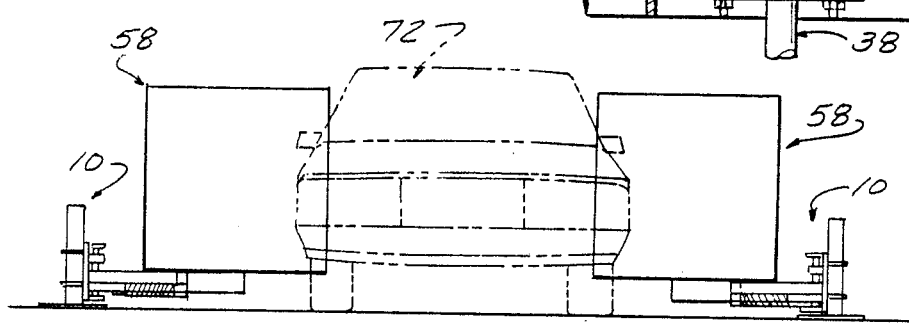
FIG. 3 is an end view of a car wash illustration a side washer installation according to the present invention.
Figure 4:
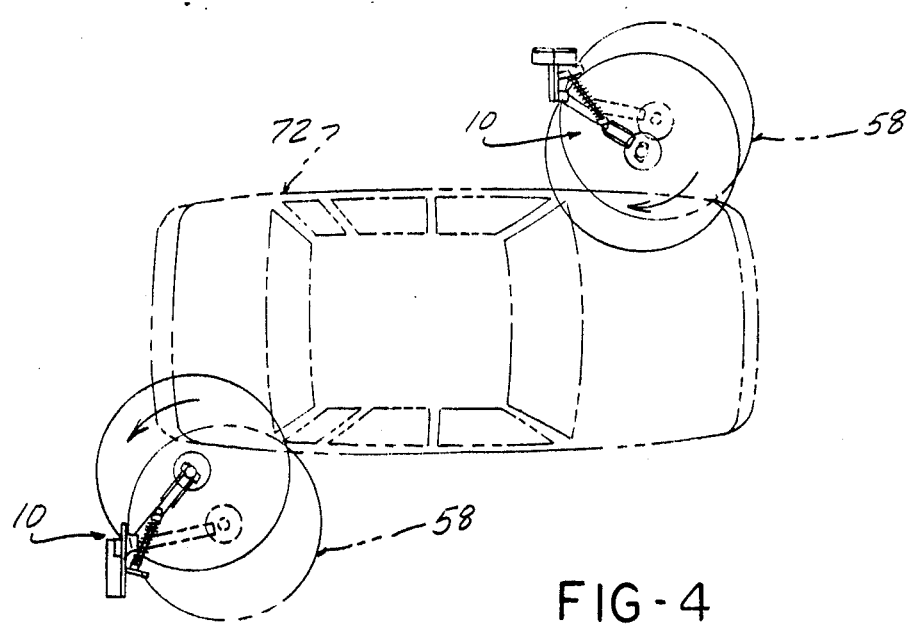
FIG. 4 is a plan view of the installation shown in FIG. 3.
Figure 5:
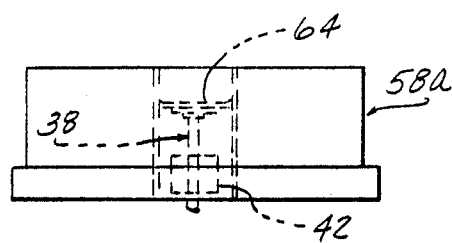
FIGS. 5-8 are diagrammatic representations of various side washer configurations contemplated as all being bottom mounted in the installation according to the present invention.
Figure 6:
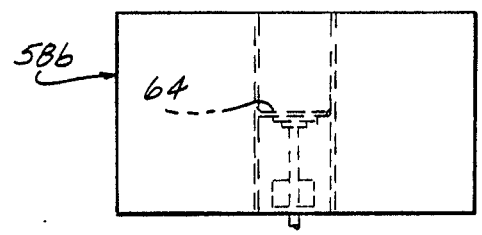

As seen in FIGS. 3 and 4, the motors, hydraulic lines, and associated hardware items are below the field of view of the vehicle occupants and almost entirely concealed by the washers 58 as the vehicle 72 passes between the plurality of washers 58 in moving down the line.

The impacting of the vehicle 72 with each washer 58 is much closer to the mounting arrangements 10 so that a greatly lessened incidence of breakage occurs due to the reduced leverage exerted on the components. These components are partially recessed into the washer cylinders 60 to at least partially protect them from the wet environment.

The web plate 64 is preferably located at the same axial distance from the bottom of each washer 58 throughout the range of washer sizes typically utilized in a given automated car wash line as depicted in FIGS. 5-8.

Thus, the web plate 64 is close to the top of a relatively short rocker panel - hub cap washer 58a, at a medium height in mid sized washers 58b, and close to the bottom of stacked van side washers 58c and long length side washers 58d.

Figure 7:
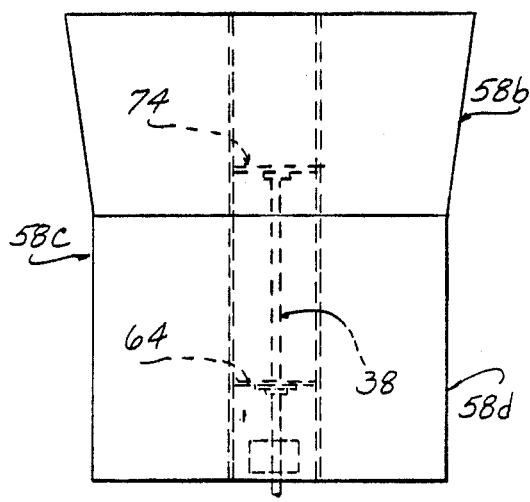
Figure 8:
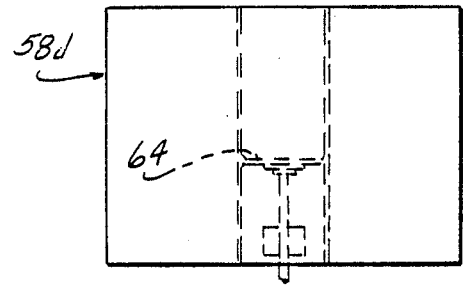

The stacked van side washers 58c are formed by connecting an intermediate and long length washers 58b and 58d by extending the drive shaft 38 to a secondary light duty hub 74 in the upper washers 58b as shown in FIG. 7.

Thus, in addition to improving the aesthetics and reducing impact damage, service and installation of the washers is rendered much more efficient and convenient.

An important additional feature of an automated car wash line according to the concept of the present invention is that the hydraulic and other plumbing systems are routed through a subgrade network, rather than in the overhead systems conventionally employed.

Figure 9:
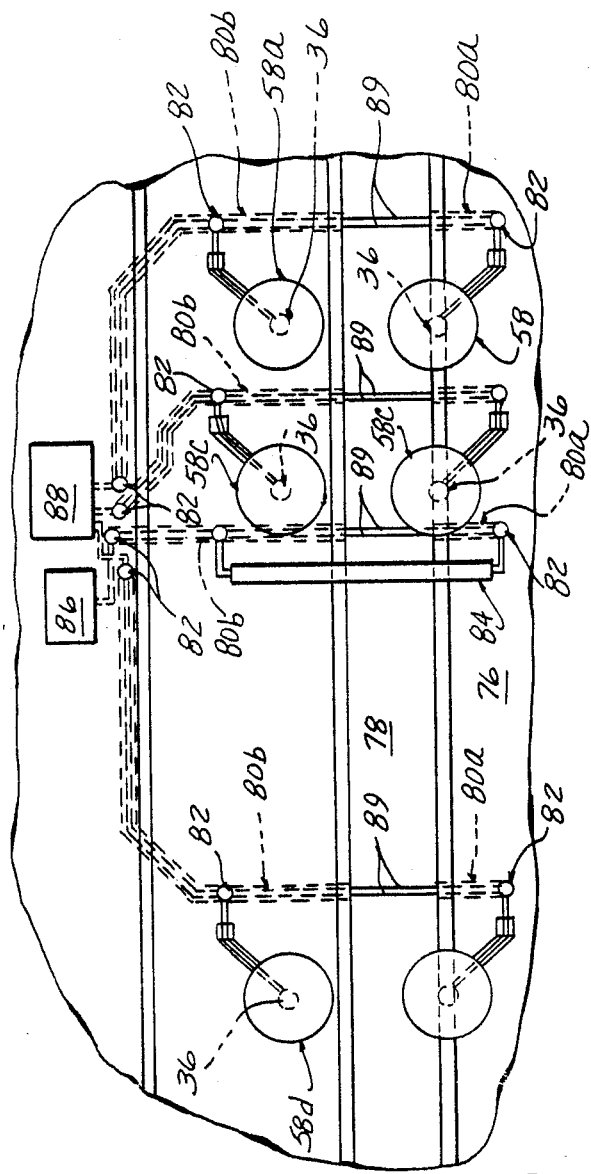
FIG. 9 is a fragmentary diagrammatic plan view of an automated car wash line according to the concept of the present invention.
Figure 10:
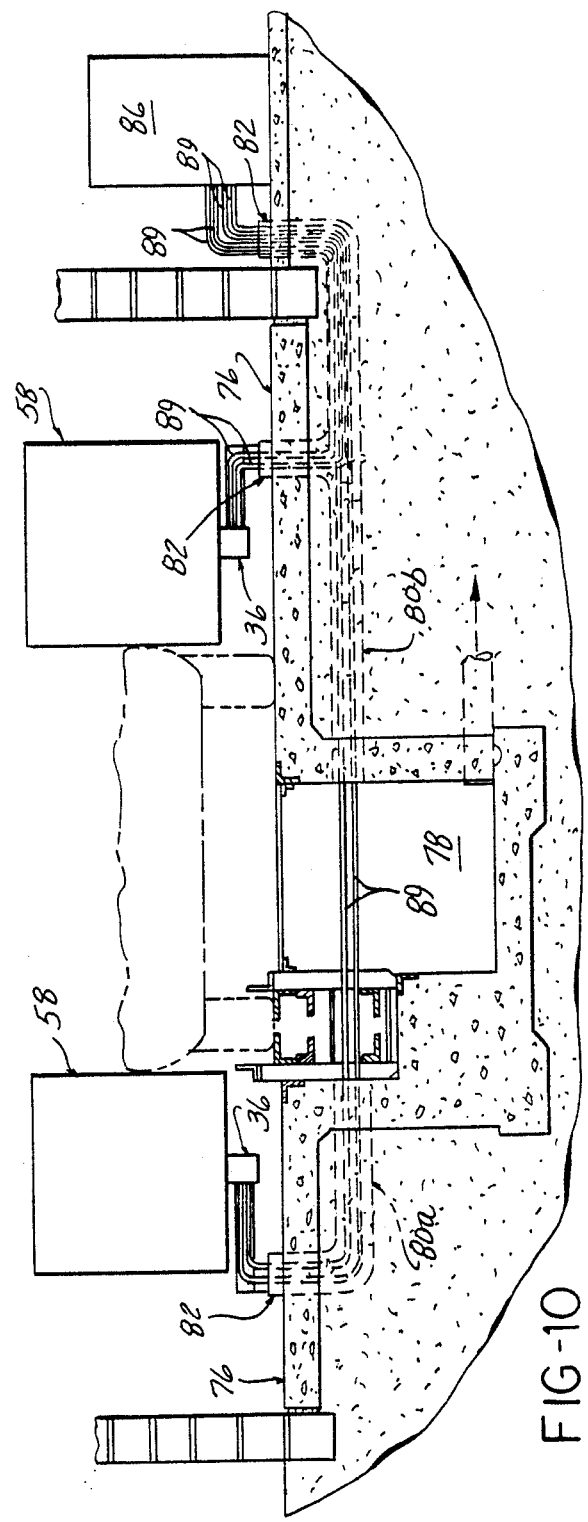
FIG. 10 is a transverse sectional view taken across the automated car wash line shown in FIG. 9.

FIGS. 9 and 10 depict an arrangement whereby this is achieved.

Specifically, during excavation and pouring of the concrete pads 76 and the water recovery pit 78, a series of chases, preferably comprised of lengths 6 inch PVC plastic piping 80, are laid. This comprises upturned stubs 82 at each location whereat a hydraulic motor 36 connection is required. Stubs 82 are preferably also provided at arches 84 where various spray on materials are applied such as soap, foam, wax, rinse, etc.

The chase segments 80a on the side of the pit 76 remote from the hydraulic supply equipment 86 or spray materials source 88 are aligned with chase segments 80b on the side adjacent the sources 86, 88 to enable plumbing lines 88 to be run to chase stubs 90 on the other side of partition wall 92 where the supply equipment 86, 88 are located to enable connections to be easily made thereto. Low cost flexible hoses 89 can be employed rather than the costly and unsightly overhead systems of rigid piping previously employed.

Accordingly, it can be appreciated that the above object of the invention is achieved by the installation and method of construction according to the present invention.

I claim:

1. An automated car wash line including an array of a plurality of vertically disposed washers, each comprising a cylinder having radially extending flexible wiper strips extending therefrom, said cylinder driven to be rotated to produce a scrubbing action, characterized by a mounting arrangement for each of said washers comprised of a pivotally mounted swing arm located at the bottom of each washer, said swing arm having a drive motor located beneath a respective washer and coupled to an upwardly extending drive shaft, and means connecting said drive shaft to said drive cylinder to enable rotation of said washer; said means connecting said drive shaft to said cylinder comprising a web plate fixed within said cylinder at a predetermined height therein and a flange attached to said drive shaft, said web plate resting atop said flange and secured thereto.

2. The automated car wash line according to claim 1 wherein washers of varying size are deployed along said line and wherein each web plate is located at the same height within each cylinder of each washer.

3. The car wash line according to claim 1 wherein said motors are hydraulically powered by pressurized hydraulic fluid from a hydraulic power source supplied via hydraulic lines and fittings.

4. The car wash line according to claim 3 further including a subgrade plumbing system for said hydraulic motors wherein plumbing lines are routed from each of said motors to said hydraulic power source.

* * * * *